United States Patent [19]
Manabe et al.

[11] Patent Number: 5,608,537
[45] Date of Patent: Mar. 4, 1997

[54] IMAGE TREATMENT APPARATUS

[75] Inventors: Naoki Manabe, Yokohama; Toshio Iwaya, Shiki; Yoshitaka Masuda, Yokohama, all of Japan

[73] Assignee: Canon Kabushiki Kaisha, Tokyo, Japan

[21] Appl. No.: 110,197

[22] Filed: Aug. 23, 1993

Related U.S. Application Data

[63] Continuation of Ser. No. 616,196, Nov. 20, 1990, abandoned.

[30] Foreign Application Priority Data

Nov. 20, 1989 [JP] Japan ................................. 1-299867
Oct. 21, 1990 [JP] Japan ................................. 2-292065

[51] Int. Cl.⁶ ................................................. H04N 1/00
[52] U.S. Cl. ........................... 358/401; 358/474; 358/487
[58] Field of Search ............................. 358/401, 487, 358/474, 497

[56] References Cited

U.S. PATENT DOCUMENTS

| | | | |
|---|---|---|---|
| 4,656,525 | 4/1987 | Norris | 358/487 |
| 4,777,515 | 10/1988 | Aikoh et al. | 355/64 |
| 4,807,041 | 2/1989 | Kishi et al. | 358/452 |
| 4,816,903 | 3/1989 | Utsuda et al. | 358/487 |
| 4,866,536 | 9/1989 | Honjo et al. | 358/494 |
| 4,870,294 | 9/1989 | Hasegawa | 358/494 |
| 4,972,068 | 11/1990 | Ohtani et al. | 235/375 |
| 4,989,099 | 1/1991 | Koshiyouji et al. | 358/497 |
| 4,991,030 | 2/1991 | Sato et al. | 358/474 |
| 5,113,268 | 5/1992 | Yoshida et al. | 358/487 |
| 5,115,308 | 5/1992 | Onuki | 358/401 |

FOREIGN PATENT DOCUMENTS

| | | |
|---|---|---|
| 0252709 | 1/1988 | European Pat. Off. . |
| 57-167054 | 10/1982 | Japan . |

Primary Examiner—Edward L. Coles, Sr.
Assistant Examiner—Thomas L. Stoll
Attorney, Agent, or Firm—Fitzpatrick, Cella, Harper & Scinto

[57] ABSTRACT

An image treatment apparatus includes a first optical device for projecting an image of a film, a second optical device for projecting an image of an original, a display for displaying the image projected by the first optical device, a reader for reading the images projected by the first and second optical devices and for emitting an image signal, and a switch for selectively directing the image of the film or the image of the original to the reader.

18 Claims, 18 Drawing Sheets

1

IMAGE TREATMENT APPARATUS

This application is a continuation of application Ser. No. 07/616,196, field Nov. 20, 1990, now abandoned.

BACKGROUND OF THE INVENTION

1. Field of the Invention

The present invention relates to an image treatment apparatus, and more particularly, it relates to an image treatment apparatus for treating microfilm, which can provide an output to an image forming apparatus such as a laser beam printer (LBP) or an ink jet printer, after reading an enlarged and projected image of microfilm and treating such image.

2. Related Background Art

In the past, there has been proposed a microfilm image treatment apparatus comprising a reader portion for projecting permeable light from a microfilm on a screen in an enlarged scale by means of a projection lens, a microfilm image reading portion for reading a focused image obtained by changing-over a path of the permeable light by the use of a scanning operation of a light receiving element (image sensor), an image treatment portion for treating an image signal from the image reading portion, and an output portion for outputting a signal from the image treatment portion to an image forming apparatus.

When image information on an original sheet such as a book and document is read by such a microfilm image treatment apparatus, an image scanner must be further provided so that the image information of the original from the image sensor is inputted to the image forming apparatus.

In this way, in the conventional microfilm image treatment apparatus, although it has the light receiving element and the image treatment portion, the original reading image scanner and the image treatment circuit therefor must be further provided, thereby increasing the complexity of the apparatus.

SUMMARY OF THE INVENTION

An object of the present invention is to eliminate the above-mentioned conventional drawback and to provide an image treatment apparatus which can read both image information of microfilm and image information of an original sheet without using an additional image reading device such as an image scanner, thereby simplifying the construction of the apparatus.

In order to achieve the above object, an image treatment apparatus according to the present invention comprises a light receiving element for converting an image of a microfilm into an electrical signal, a first optical focusing system for focusing the image of the microfilm onto the light receiving element, a second optical focusing system for focusing an image of an original onto the light receiving element, and a switching element for performing a switching operation so that the image of the microfilm or the image of the original can selectively be projected on the light receiving element.

In the present invention, when the image of the microfilm is read, the first optical focusing means is activated by the switching means so that the image of the microfilm is projected on the light receiving element; whereas, when the image of the original is read, the second optical focusing means is activated by the switching means so that the image of the original is projected on the light receiving means.

BRIEF DESCRIPTION OF THE DRAWINGS

FIG. 1 is a perspective view of the image treatment apparatus;

FIG. 2 is an elevational sectional view of the apparatus showing a schematic internal construction thereof;

FIG. 3 is enlarged view of a mirror switching mechanism;

FIG. 4 is a perspective view of a reading carriage;

FIG. 5 is a control block diagram of a drive treatment system;

FIG. 6 is a control block diagram of an image treatment system; and

FIG. 7 is a flow chart of a drive control system.

FIG. 8 is an explanatory view showing a schematic construction of a switching mechanism for an image sensor; and FIG. 9 is a schematic perspective view of a support platform for the image sensor.

FIG. 10 is a perspective view of the image treatment apparatus;

FIG. 11 is an elevational sectional view of the apparatus showing a schematic internal construction with an original holding carrier being unmounted;

FIG. 12 is an elevational sectional view of the apparatus showing a schematic internal construction with the original holding carrier being mounted;

FIG. 13 is an enlarged sectional view of an original holding carrier mounting portion;

FIG. 14 is a schematic perspective view of a sensor carriage; and

FIG. 15 is a schematic perspective view of the original holding carrier.

DETAILED DESCRIPTION OF THE PREFERRED EMBODIMENTS

The present invention will now be explained in connection with embodiments thereof with reference to the accompanying drawings.

FIGS. 1 to 7 show a first embodiment of the present invention.

Figure 1:
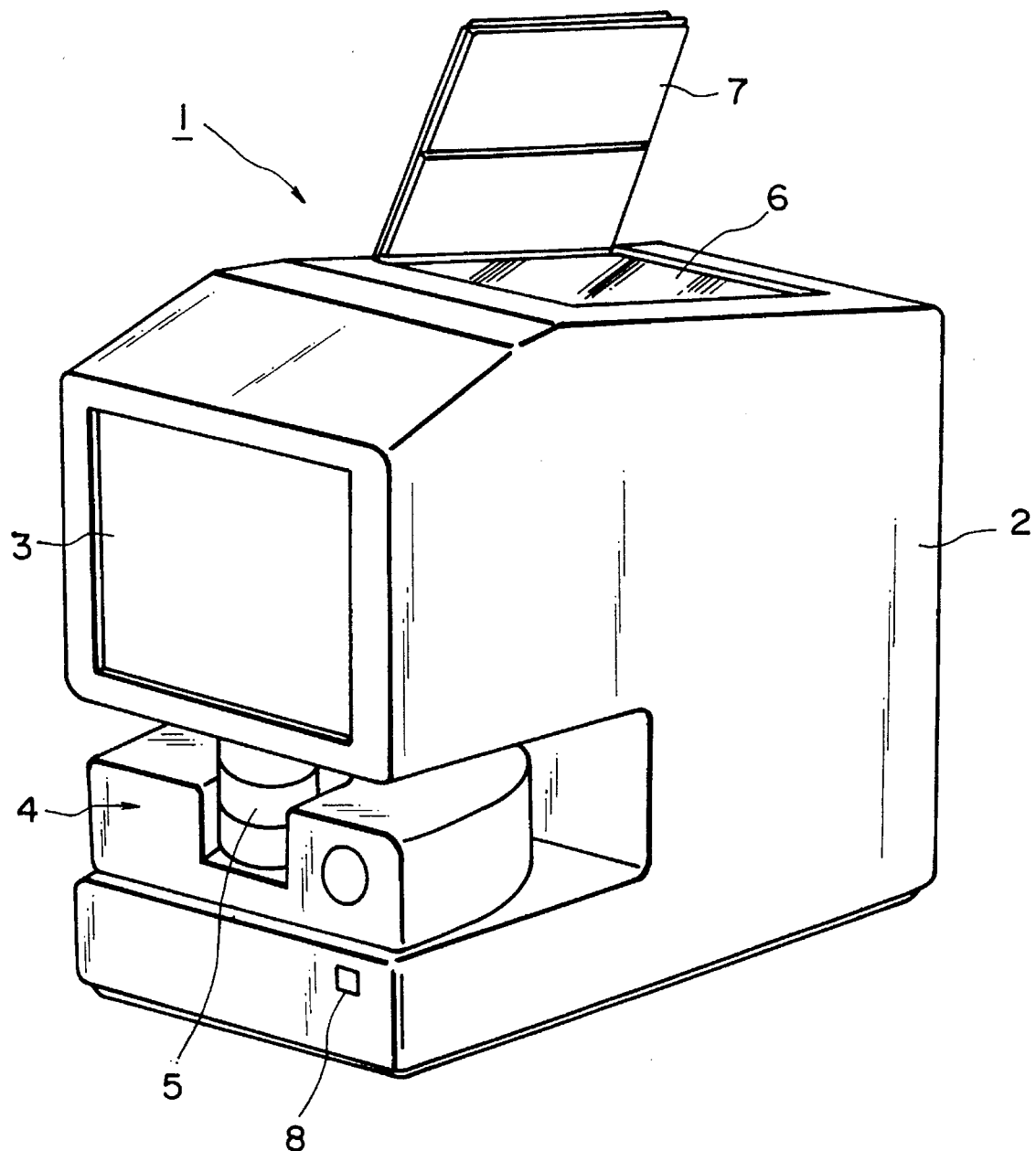
FIGS. 1 to 7 show an image treatment apparatus according to a first embodiment of the present invention, where.

In FIG. 1, an image treatment apparatus designated generally as 1 is capable of reading both a light image passing through microfilm and a light image reflected from a normal original. A screen 3 on which an image from the microfilm is projected in an enlarged scale is disposed on a front side of a body case 2 of the image treatment apparatus. Below the screen 3, there is arranged a film feeding mechanism 4 for feeding the microfilm, and a lens holding portion 5, for projecting the image of the microfilm onto the screen 3, disposed between the screen 3 and the film feeding mechanism 4.

On the other hand, an original support plate 6, comprised of a transparent glass plate on which a normal original is rested, and an original holding-down cover 7 for covering the original support plate 6, are arranged on an upper surface of the body case 2. Further, on the front surface of the body case 2, there is arranged a mode change switch 8 for selecting one of control modes, i.e., a film reading mode or an original reading mode.

Figure 2:
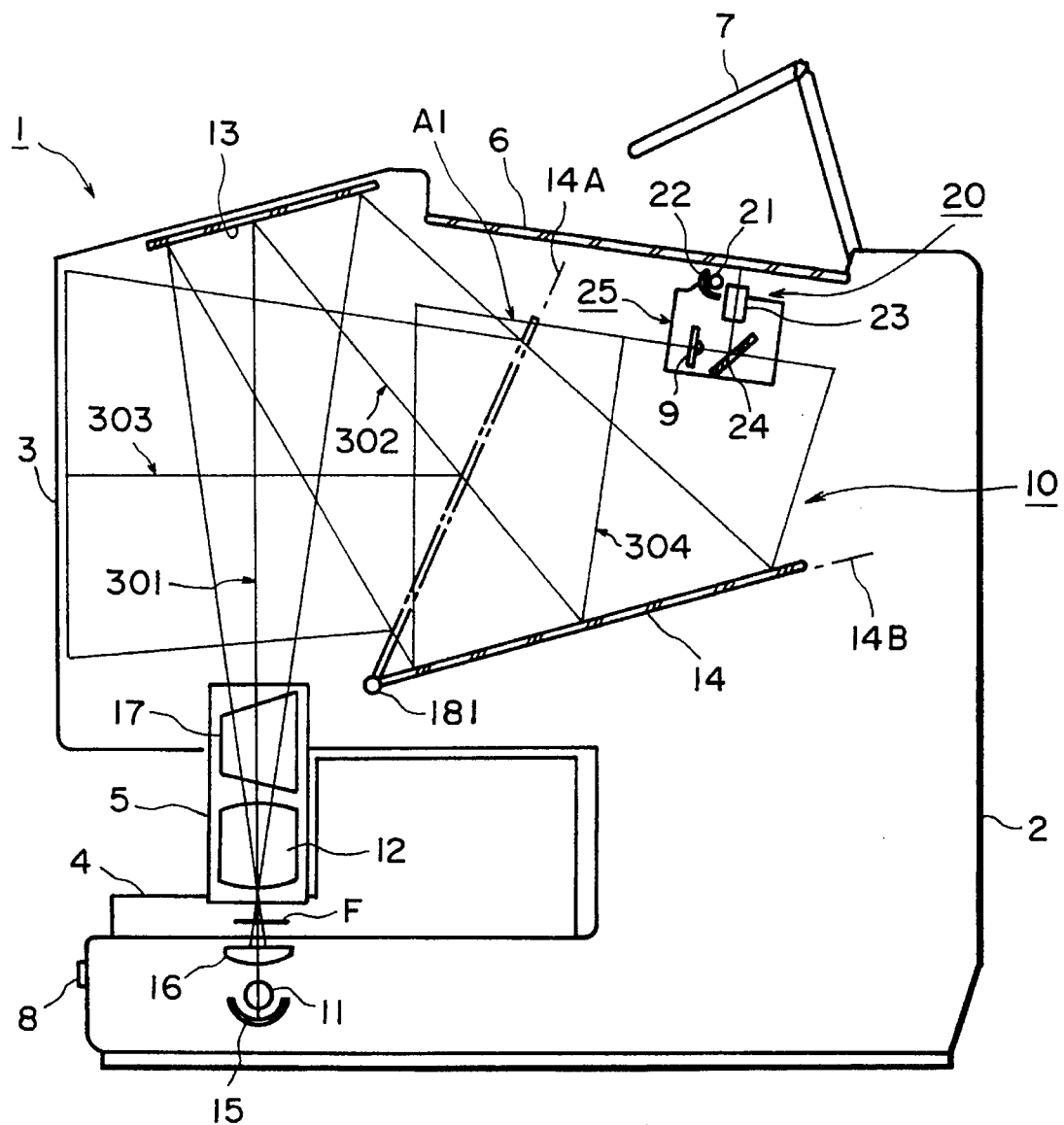

As shown in FIG. 2, the body case 2 incorporates therein an image sensor 9 as a light receiving element for converting the image of the microfilm F into an electrical signal, a first optical focusing system 10 for focusing the image of the microfilm F onto the image sensor 9, and a second optical focusing system 20 for focusing the image of the normal original P such as a paper sheet or a book onto the image sensor 9.

The first optical focusing system 10 includes a lamp 11 for illuminating the back surface of the microfilm F, a focusing lens 12 held by the lens holding portion 5, and a fixed mirror 13 and a rotary mirror 14 for changing the direction of a light path.

A reflection plate 15 is disposed behind the lamp 11, and a condenser lens 16 for gathering the illuminating light from the lamp 11 is disposed between the lamp 11 and the microfilm F. Further, the lens holding portion 5 includes a prism 17 for changing the orientation of the focused image of the microfilm in longitudinal and transverse directions.

The lamp 11, the microfilm F, the focusing lens 12, and the fixed mirror 13 are arranged on a common optical axis in an up-and-down direction, and the fixed mirror 13 is fixed to an inner top surface of the body case 2 so as to incline with respect to the common optical axis.

On the other hand, the rotary mirror 14 is disposed at an opposite side of the screen with respect to a first light path 301 between the focusing lens 12 and the fixed mirror 13. The rotary mirror 14 is rockable around a pivot 181 arranged at a lower end of that mirror between a reader mode position 14A where the mirror 14 is cocked in the longitudinal direction to face the screen 3 and a film reading mode position 14B where the mirror 14 faces the original support plate 6 formed on the upper surface of the body case 2.

In the reader mode position 14A, the light path is constituted by a second light path 302 between the fixed mirror 13 and the rotary mirror 14, and a third light path 303 between the rotary mirror 14 and the screen 3, thereby permitting the focusing of the image of the microfilm F onto the screen 3. On the other hand, in the film reading mode position 14B, the light path is folded back from the second light path 302 between the fixed mirror 13 and the rotary mirror 14 to a fourth light path 304 directed from the rotary mirror to the original support plate 6 arranged on the upper surface of the body case 2, whereby the image of the microfilm F is focused at an image focusing position A1 spaced apart from and below the original support plate 6 by a predetermined distance. The image focusing position A1 is parallel to the original support plate 6 and the image sensor 9 as the light receiving element is disposed on this image focusing position A1.

On the other hand, the second optical focusing system 20 includes a lamp 21 for illuminating the surface of the original, a curved reflection plate 22 for reflecting the light from the lamp 21, a short-focus lens array 23, and a switching-over mirror 24 as a switching means for folding back the light passed through the short-focus lens array 23 toward the image sensor 9. These elements 21–24 are mounted altogether on a reading carriage 25. The image sensor 9 is preferably of a line-reading type which can read the image per a predetermined line width, so that the entire image is read and scanned by reciprocally moving the reading carriage 25 in a direction perpendicular to the image sensor 9, i.e., in a direction shown by the arrow in FIG. 2.

Figure 4:
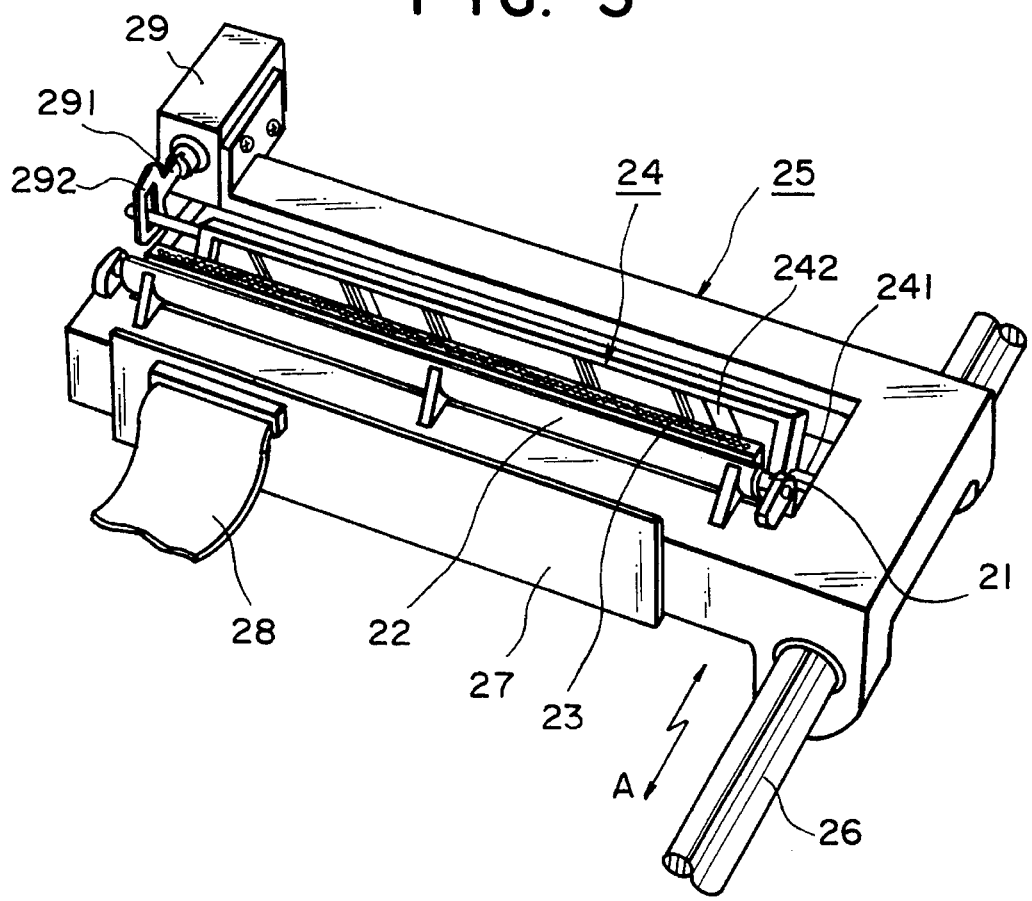

As shown in FIG. 4, the reading carriage 25 is slidably mounted at its one end on a carriage guide rail 26 fixed to the body case 2 and is connected to a motor (not shown) so that it can be reciprocally shifted along the guide rail 26 (in directions shown by the arrow A in FIG. 4) at a constant speed. Further, a circuit board 27 to which the image sensor 9 is attached is fixed to a side surface of the reading carriage 25, and one end of a connection code 28 such as a flexible flat cable is connected to the circuit board 27.

The reciprocal direction of the reading carriage 25 is parallel to the image focusing position or plane A1 of the first optical focusing system 10, so that, by changing the position of the switching-over mirror 24, original image light B2 from the original P or film image light B1 is selectively introduced into the image sensor 9.

Figure 3:
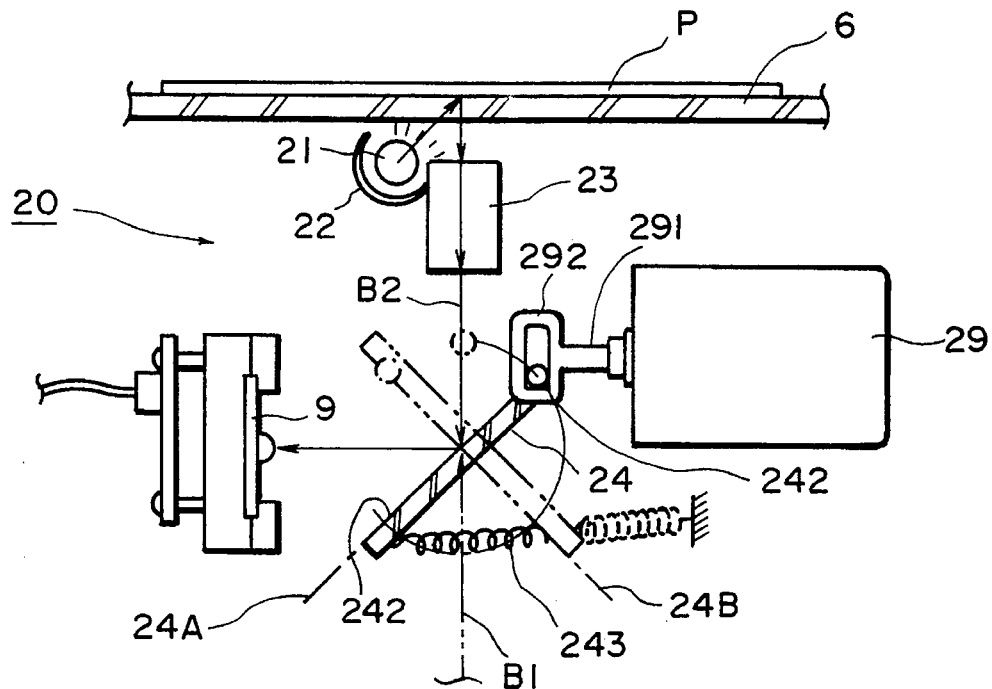

As shown in FIGS. 3 and 4, the switching-over mirror 24 is rotatably supported by the reading carriage 25 through mirror pivot shafts 241 protruding from both ends of the mirror 24 so that it can be rocked between an original reading mode position 24A where a reflection surface 242 of the mirror 24 is inclined by 45 degrees to face upwardly and a film reading mode position 24B where the reflection surface 242 is inclined by 45 degrees to face downwardly. The switching of the position of the switching-over mirror 24 is controlled by a solenoid 29.

More particularly, a cam shaft 242' protrudes from one end of the switching-over mirror 24 at a position spaced apart from the central pivot shaft 241 and is engaged by an elongated cam slot of a cam 292 formed on a plunger 291 of a solenoid 29 fixed to the reading carriage 25. The cam slot 292 extends in a direction perpendicular to a reciprocal moving direction of the plunger 291 so that, when the switching-over mirror 24 is rocked, the cam shaft 242' can be shifted in the direction perpendicular to the moving direction of the plunger 291.

A spring 243 is attached to the switching-over mirror 24 to bias the latter in a counter-clockwise direction in FIG. 3, so that the switching-over mirror 24 is always biased toward a direction to rotate it from the original reading mode position 24A to the film reading mode position 24B, thereby positioning the mirror to the film reading mode position 24B. When the solenoid 29 is energized to magnetically attract the plunger 291, the switching-over mirror 24 is rotated in a clockwise direction in FIG. 3 against the biasing force of the spring 243, thus positioning and fixing the mirror to the original reading mode position 24A.

In case where the light path is switched over by the switching-over mirror 24 in this way, the mirror 24 can be switched over by rotating the latter only by 90 degrees, with the result that the mirror can be driven even by a driving mechanism such as a straight moving solenoid having a short stroke, without using any driving mechanism such as a motor and a rotary solenoid providing a rotational movement.

Figure 5:
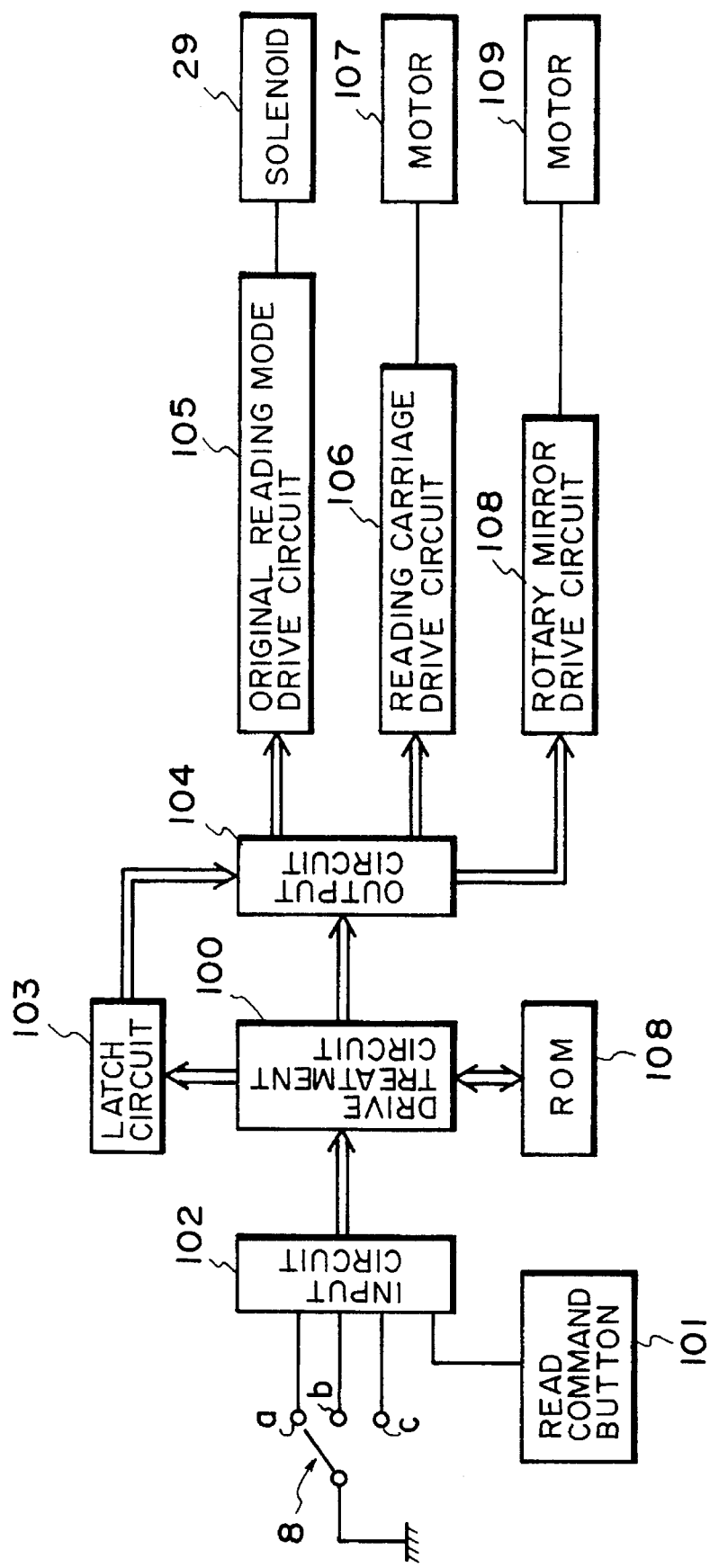

FIG. 5 shows a block diagram of a drive control circuit.

More particularly, in FIG. 5, the reference numeral 100 denotes a main drive treatment circuit which performs various calculations on the basis of a control program and fixed data stored in a memory circuit (ROM), treats input signals, and emits output signals. The input signals, including a mode signal from the mode change switch 8 and a reading start signal from a read command button 101, are sent to the drive treatment circuit 100 through an input circuit 102.

On the other hand, the output or control signals treated and calculated by the drive control circuit 100 are sent to an output circuit 104 directly or through a latch circuit 103, and then to an original reading mode drive circuit 105 and a reading carriage drive circuit 106 both connected to the output circuit 104. In this way, the solenoid 29, a motor 107 for driving the reading carriage 25, and a motor 109 for driving the rotary mirror 14 are controlled and driven by the drive treatment circuit 100 through the original reading mode drive circuit 105, reading carriage drive circuit 106, and a rotary mirror drive circuit 108, respectively.

Figure 6:
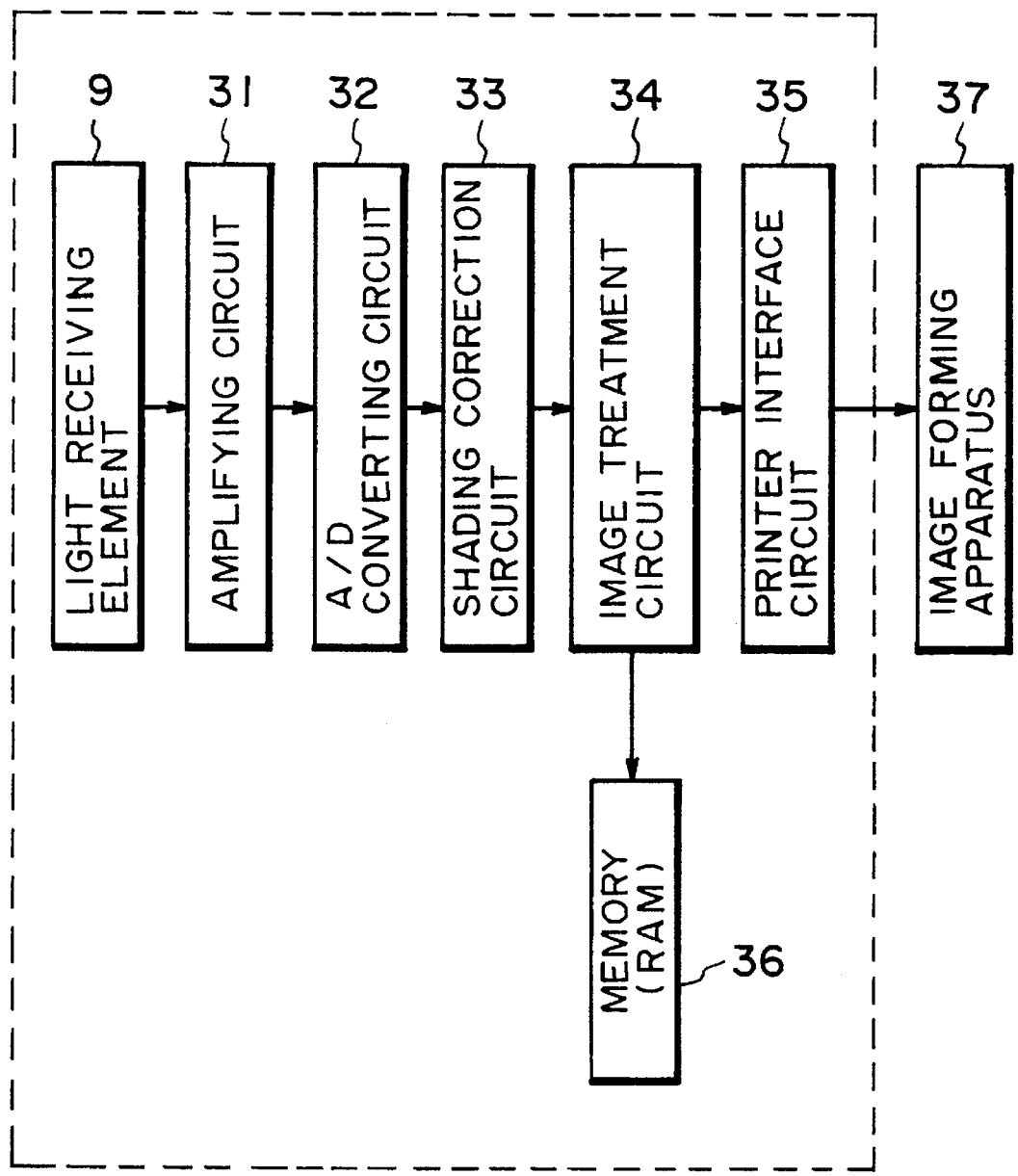

FIG. 6 shows a circuitry of an image treatment portion of the image treatment apparatus according to the illustrated embodiment, and arrows shown therein indicate a flow of an image signal.

As shown in FIG. 6, the image of the microfilm F or the image of the original P is converted into the electrical signal by means of the image sensor (light receiving element) 9 and is inputted to an amplifying circuit 31 where the signal is amplified. The amplified signal is inputted to an image treatment circuit 34 through an A/D converting circuit 32 and a shading correction circuit 33. After treated in the image treatment circuit 34, the signal is outputted to an image forming apparatus 37 such as LBP, ink jet printer or the like through a printer interface circuit 35. Further, the signal from the image treatment circuit 34 is stored in a memory (RAM) 36. Incidentally, in FIG. 6, a CPU ( central processing unit), an operation portion, or the like are omitted.

Figure 7:
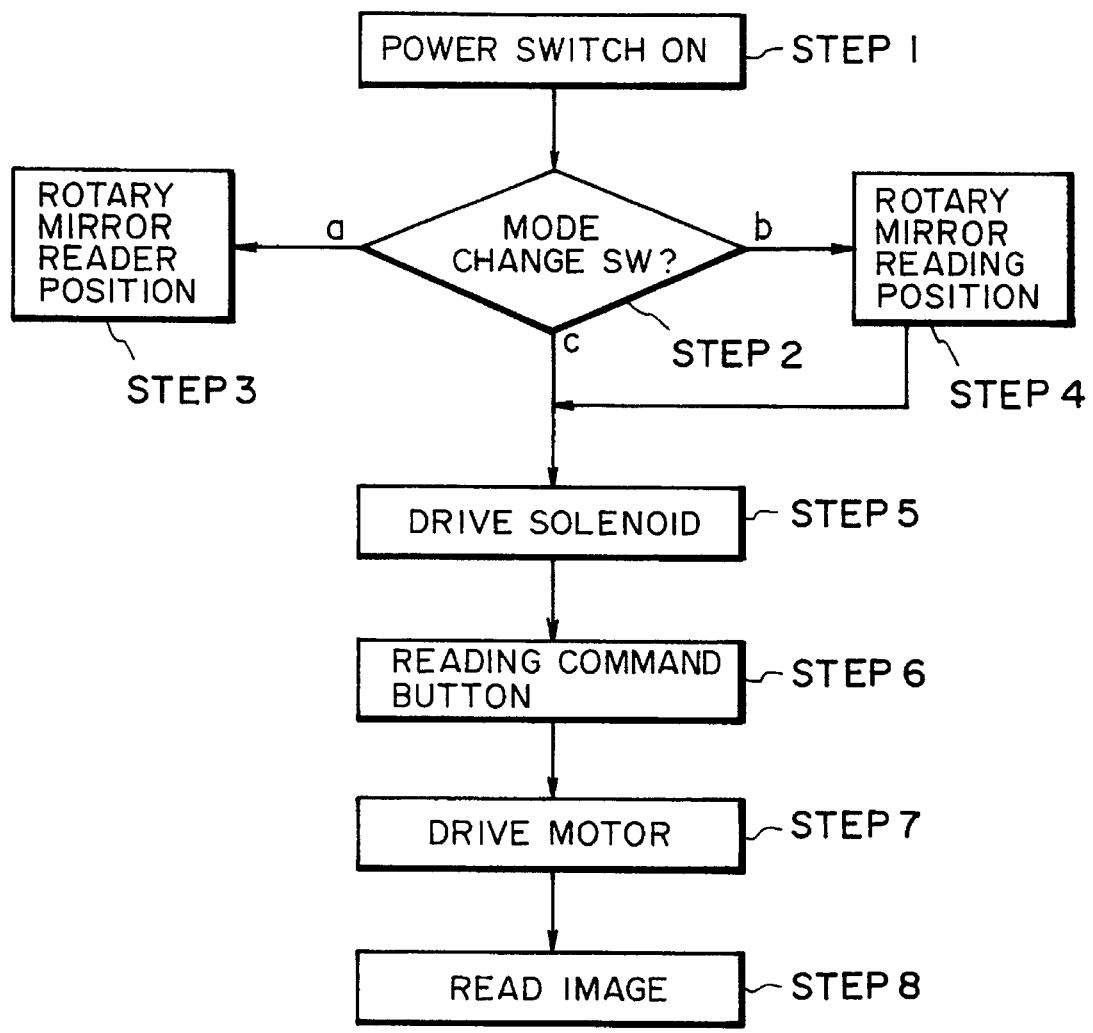

Next, the operation of the image treatment apparatus according to the illustrated embodiment will be explained with reference to a flow chart shown in FIG. 7.

When a power switch is turned ON (STEP 1), it is determined which mode is selected in the mode change switch 8 (STEP 2).

Hereinafter, each of modes will be explained.

(i) Reader Mode:

When the reader mode a is selected, the rotary mirror 14 for switching the light path is rotated to be positioned to the reader mode position 14A (STEP 3). In this position, the image light from the microfilm is projected on the screen 3 through the focusing lens 12, the prism 17, the fixed mirror 13 and the rotary mirror 14. Incidentally, in this mode, it is necessary that the original support plate 6 formed on the upper surface of the body case 2 must be covered by the original hold-down cover 7.

(ii) Film Reading Mode:

When the film reading mode b is selected, the rotary mirror 14 is rotated to be positioned to the film reading mode position 14B (STEP 4). Then, the solenoid 29 is turned OFF, with the result that the switching-over mirror 24 mounted on the reading carriage 25 is positioned, by the spring force of the spring 243, to the film reading mode position 24B where the reflection surface 242 is inclined to face upwardly (STEP 5).

Then, when the read command button 101 is depressed (STEP 6), the motor 107 for driving the reading carriage 25 is driven (STEP 7) to provide the scanning movement of the reading carriage 25 along the image focusing plane A1, thereby reading the entire surface of the microfilm image by means of the image sensor 9 (STEP 8). Also in this mode, the original support plate 6 must be covered by the original hold-down cover 7.

(iii) Original Reading Mode:

When the original reading mode c is selected, the solenoid 29 is turned ON, with the result that the switching-over mirror 24 is rotated, through the cam shaft 242' engaging by the cam slot 292 of the plunger 291, in the counter-clockwise direction in FIG. 3 to be positioned to the original reading mode position (STEP 5). Then, after the original P is set on the original support plate 6 and is held down by the cover 7, the read command button 101 is depressed (STEP 6). When the read command signal is inputted, the motor 107 is driven to move the reading carriage 25, thus performing the scanning and reading operation regarding the original image.

Figure 8:
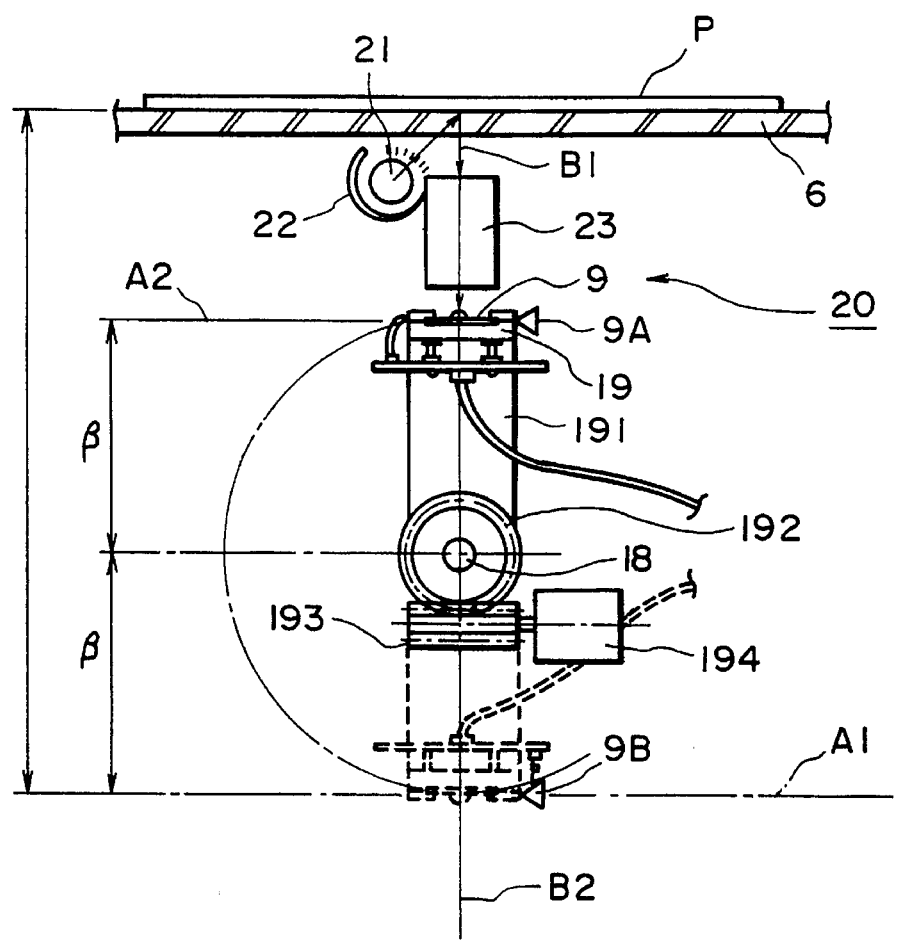
FIGS. 8 and 9 show an image treatment apparatus according to a second embodiment of the present invention, where.
Figure 9:
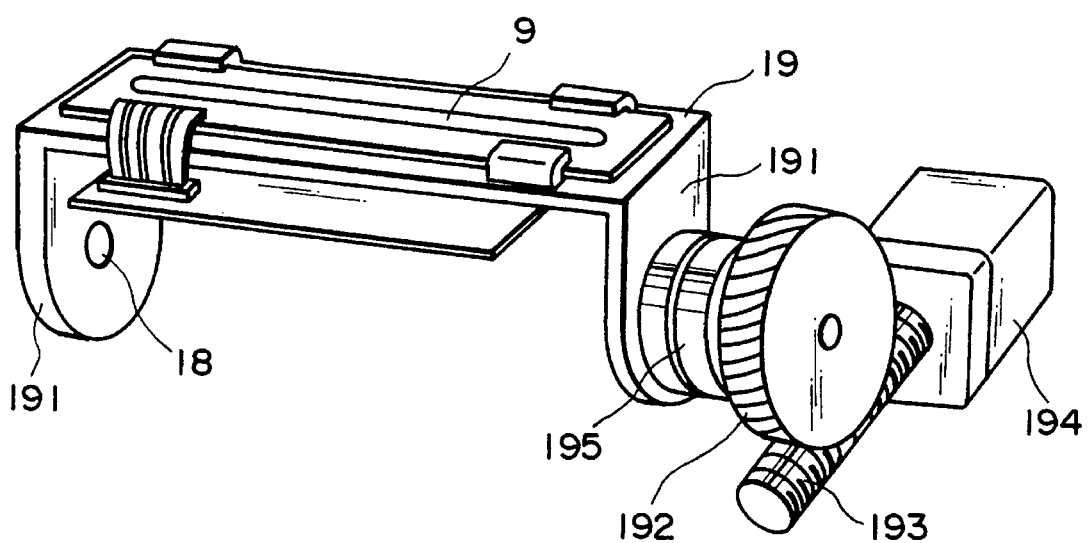

FIGS. 8 and 9 show a microfilm image treatment apparatus according to a second embodiment of the present invention.

In this second embodiment, the switching-over mirror (switching means) 24 as in the first embodiment is omitted; the apparatus of the second embodiment is of image sensor rotation switching type wherein the mode changing is effected by rotating the image sensor. Accordingly, the image light B1 of the original and the image light B2 of the microfilm are directly received by the image sensor 9, and, in the original reading mode, the image sensor 9 is positioned at a focusing plane of the short-focus lens array 23.

More particularly, the image sensor 9 is selectively positioned between an original reading mode position 9A where the image focusing plane A1 on which the image of the microfilm is focused at the same magnification by means of the first optical focusing system 10 is formed at a position spaced apart from the focusing plane of the original by a predetermined distance β and the light receiving face of the image sensor 9 coincides with the image focusing plane A2 of the original P, and a film reading mode position 9B where the light receiving face of the image sensor 9 coincides with the same magnification image focusing plane A1 of the microfilm. By selecting the value of the distance β at will, the freedom of a gap α of a scanning stroke can be increased.

The image sensor 9 is attached to a support platform 19 spaced apart from a rotary shaft 18 by a predetermined radial distance through support arms 191, and is rocked between the original reading mode position 9A and the film reading mode position 9B by rotating the rotary shaft 18. A driving mechanism for the rotary shaft 18 comprises a worm wheel 192 attached to the rotary shaft 18, a worm gear 193 meshed with the worm wheel 192, a motor 194 for rotating the worm gear 193, and a torque limiter 195. By controlling the rotation amount of the motor 194, the control mode position of the image sensor 9 can be changed.

Other fundamental constructions and operation of the image treatment apparatus according to the second embodiment are the same as those of the first embodiment.

FIGS. 10 to 15 show a microfilm image treatment apparatus according to a third embodiment of the present invention.

Figure 10:
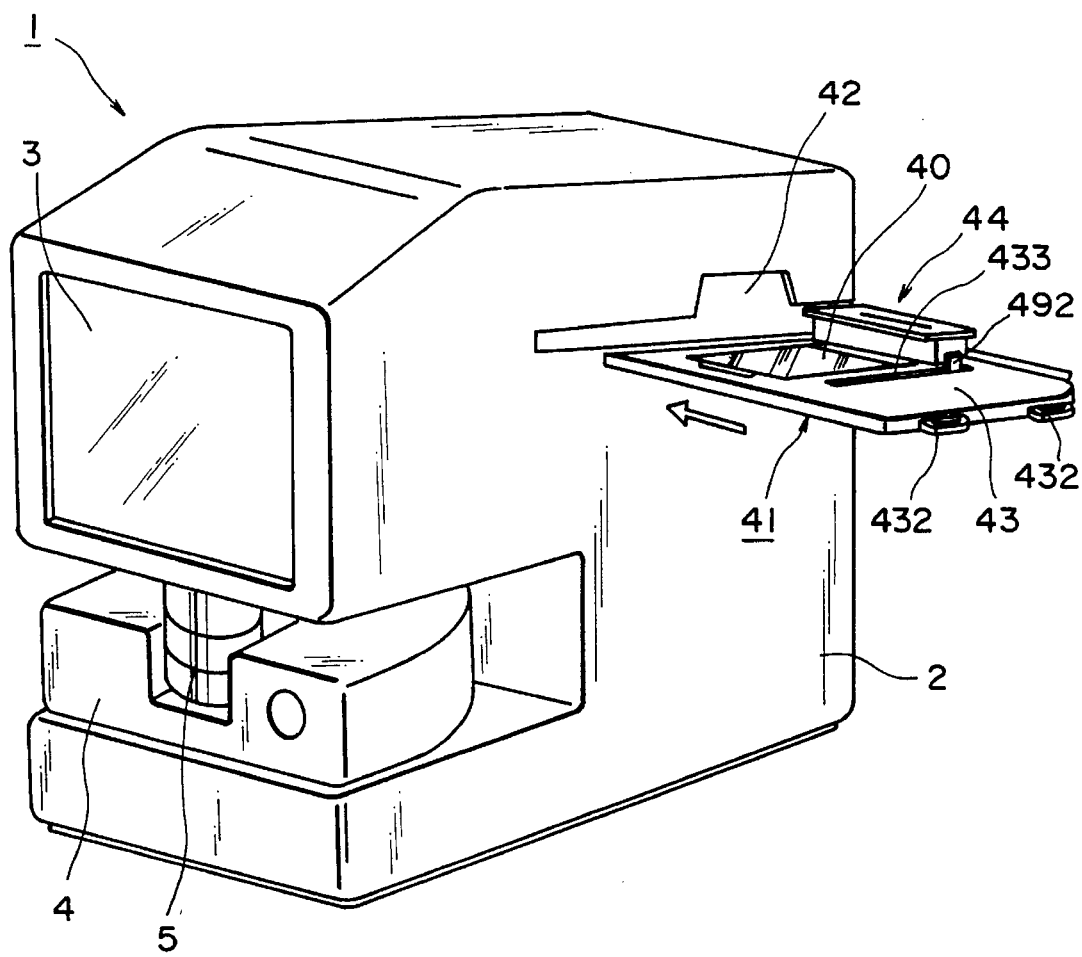
FIGS. 10 to 15 show an image treatment apparatus according to a third embodiment of the present invention, where.

FIG. 10 shows an appearance of the microfilm image treatment apparatus wherein, as in the first embodiment of FIG. 1, a screen 3 on which an image from the microfilm is projected in an enlarged scale is disposed on a front surface of a body case 2 thereof. Below the screen 3, there is arranged a film feeding mechanism 4 for feeding the microfilm, and a lens holding portion 5, for projecting the image of the microfilm onto the screen 3, is disposed between the screen 3 and the film feeding mechanism 4.

In this third embodiment, an original support plate 40 on which an original is rested is assembled on an original holding carrier 41 which can be removably mounted on the body case 2. An insertion opening 42 through which the original holding carrier 41 is mounted on the apparatus is formed in the side surface of the body case 2. The original holding carrier 41 comprises a plate-shaped glass holding frame 43, the original support plate 40 made of a flat glass plate held by the glass holding frame 43, and an optical scanner 44 for scanning and reading the original rested on the original support plate 40.

The glass holding frame 43 has a rectangular shape and has a sliding portion 431 which is formed on one of sides of the frame extending along the inserting direction to the body case 2 and which can be slidably fitted into a recess 451 of a guide rail 45 fixed to the body case 2. The original support plate 40 is disposed on the glass holding frame 43 at a position nearer to an inlet end (insertion end) thereof. Further, gripping members 432 for mounting and dismounting the glass holding frame 43 with respect to the body case are formed on an end of the frame 43 opposite to the insertion end thereof.

On the other hand, the optical scanner 44 reads and scans the original rested on the original support plate 6 in a direction perpendicular to the inserting direction of the original holding carrier 41, and is assembled as a unit wherein an illumination lap 46 and a reflection plate 47 for illuminating the original, and a short-focus lens array 48 are integrally attached to a holder 49. A roller 491 is rotatably mounted on one end of the holder 49, which roller is adapted to rotatably contact with a back surface of the insertion end of the glass holding frame 43 of the original holding carrier 41. Further, a projection 492 (FIG. 10) is formed on the other end of the holder 49, which projection is engaged by a guide slot 433 formed in the frame 43 along one edge of the original support plate 40, so that the reading and scanning of the optical scanner 44 is effected along this guide slot 433.

The holder 49 has a substantially rectangular shape and is provided at its both upper lateral edges with flanges 493 protruding toward the terminals of the reading and scanning direction, which flanges are adapted to be engaged by and disengaged from a sensor carriage 50 mounted on the body case 2. Further, the flanges 493 are tapered at their insertion ends to facilitate the insertion of the holder 49 to the body case. The original support plate 40 is rotatably connected, at its one edge, to the glass holding frame 43 through hinges 401.

Figure 11:
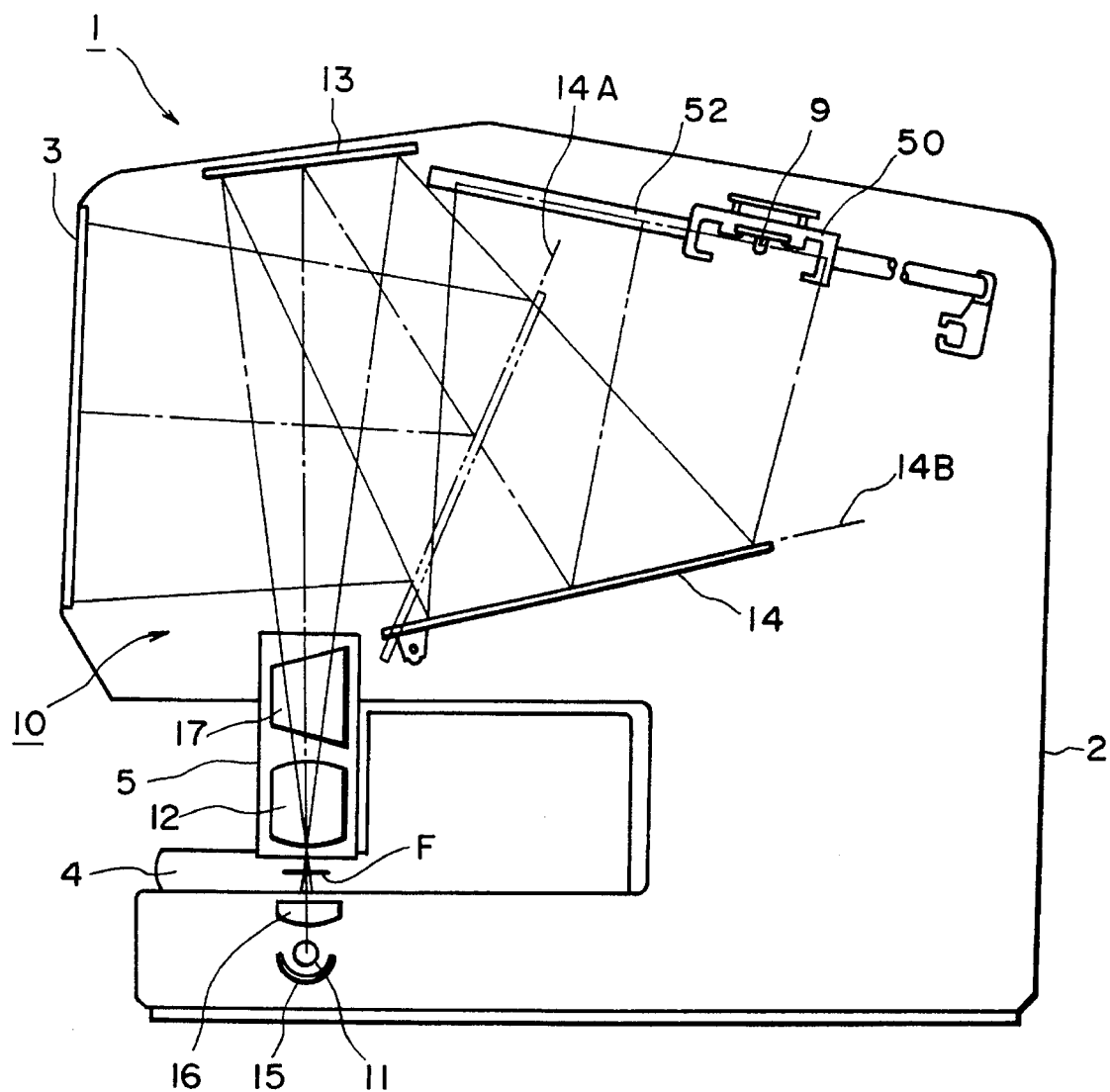

FIG. 11 shows the internal arrangement of the body case 2 with the original holding carrier 41 being unmounted.

More particularly, as in the first embodiment of FIG. 2, the light from the lamp (light source) 11 is gathered by the condenser lens 16, and the light passing through the condenser lens 16 illuminates the microfilm F held by the film feeding mechanism 4 from the underside. The image of the microfilm F is enlarged by the focusing lens 12 and is deflected by the fixed mirror 13 and the rotary mirror 14, and is projected on the screen 3.

Next, a light path for the reading will be explained. Now, a line sensor of contact type such as a CCD (charge coupled device) is used as the image sensor 9. When the reading of the image is commanded from, for example, the operation portion (not shown), the rotary mirror 14 is shifted up to a position shown by a phantom line in FIG. 11 and is stopped there. Then, the image of the microfilm F can be read by scanning the focusing plane A1 by means of the light receiving element 9.

Figure 14:
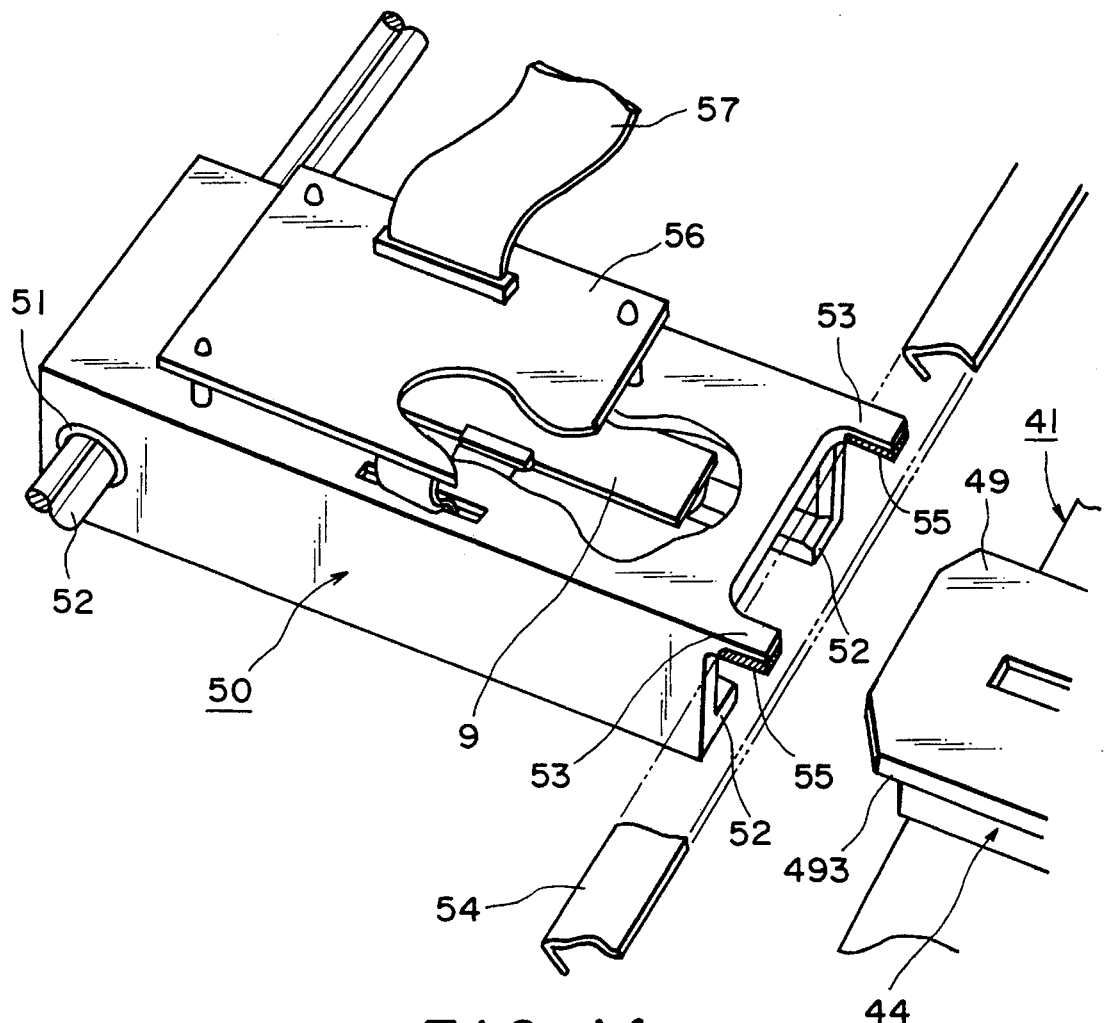
Figure 15:
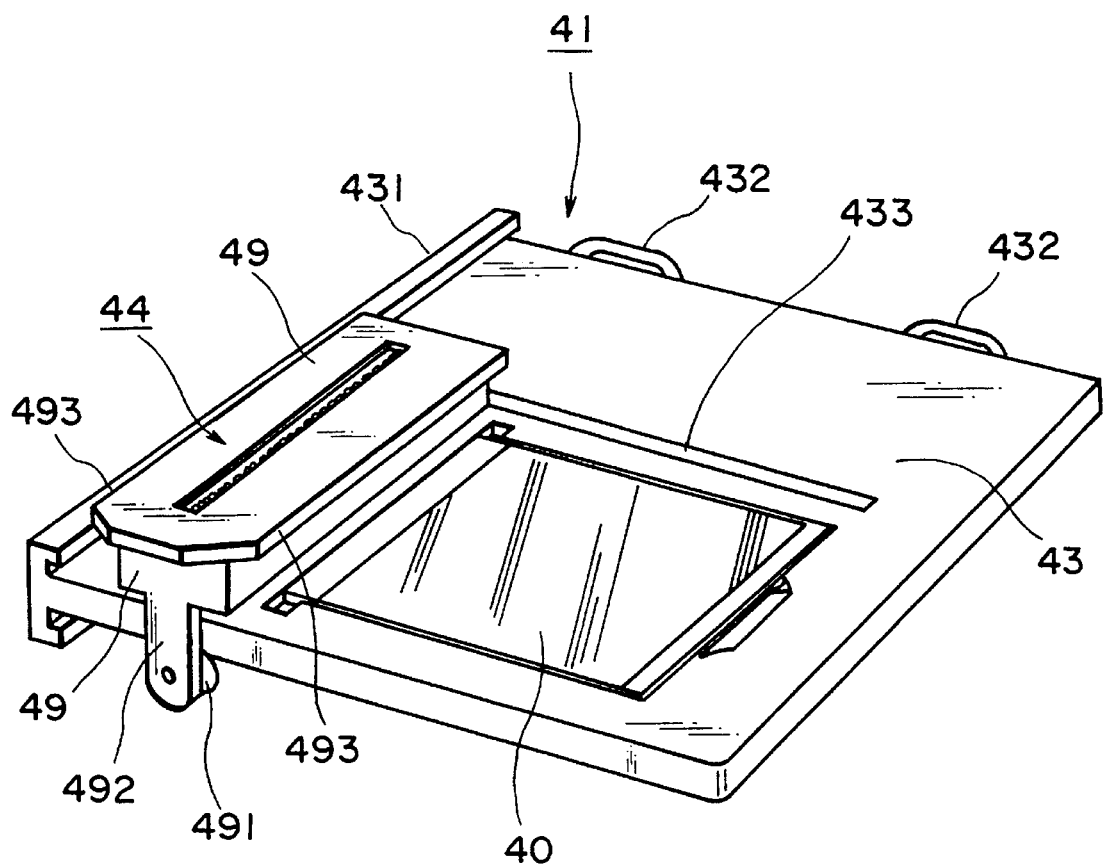

As shown in FIG. 14, the image sensor 9 is attached to the sensor carriage 50 one end of which is slidably mounted on a rail 52 fixed to the body case 2 through a slide bearing 51. Further, the sensor carriage 50 is provided at its other end with guide projections 53 which slidably contact with an auxiliary rail 54 fixed to the body case 2 through slide members 55. Further, a circuit board 56 is attached to the top of the sensor carriage 50, and one end of a flexible connection code 57, such as a flat cable, is connected to the circuit board 56.

Figure 12:
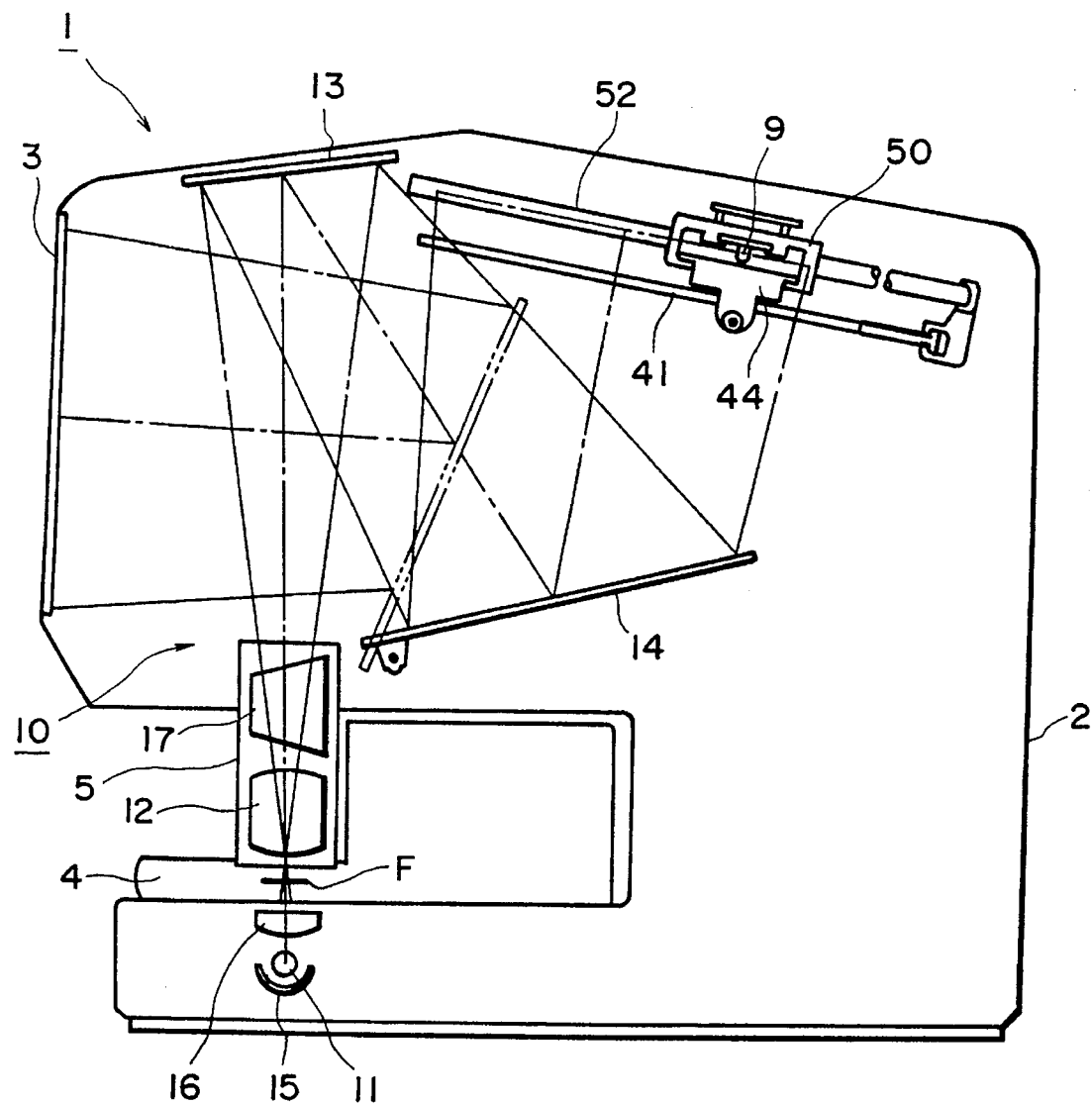
Figure 13:
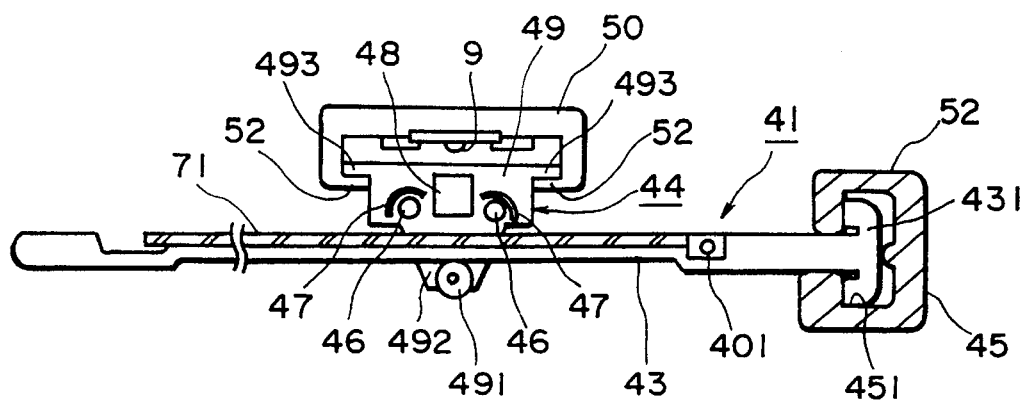

FIG. 12 shows the internal arrangement of the body case 2 with the original holding carrier 41 being mounted therein and the optical scanner 44 being mounted on the scanner guide rails 52' of the sensor carriage 50. The optical scanner 44 constitutes a second optical focusing system 20, the positional relation between the short-focus lens array 48, the image sensor 9 and the original support plate 40 is determined by the flanges 493 engaged by the scanner guide rail 52 of the sensor carriage 50, and the roller 491 engaged by the back surface of the original holding carrier 41.

In this third embodiment, when the reader mode or the film reading mode is carried out, the original holding carrier 41 is removed from the body case 2. And, in the reader mode, the image of the microfilm is focused and projected on the screen 3 through the first, second and third light paths 301, 302, 303, as in the first embodiment.

Further, in the film reading mode, the rotary mirror 14 is rotated to be positioned to the film reading mode position 14B, so that the image of the microfilm is focused on the image sensor 9 through the first, second, third and fourth paths 301, 302, 303, 304, and, by shifting the sensor carriage 50, the image sensor 9 reads and scans the image focusing plane A1 to read the image of the microfilm.

On the other hand, in the original reading mode, the original holding carrier 41 is inserted into the carrier insertion opening 42 formed in the side surface of the body case 2 with the original being rested on the predetermined position. In this case, the optical scanner 44 is inserted into the sensor carriage 50 through the guide rails 52' and is fixed in place. Although not shown, when the optical scanner 44 is completely inserted into the sensor carriage, the terminal of the illuminating lamp 46 of the optical scanner 44 is connected to the terminal of the power source.

The optical scanner 44 is shifted together with the sensor carriage 50 to read the image of the original.

Figure 16:
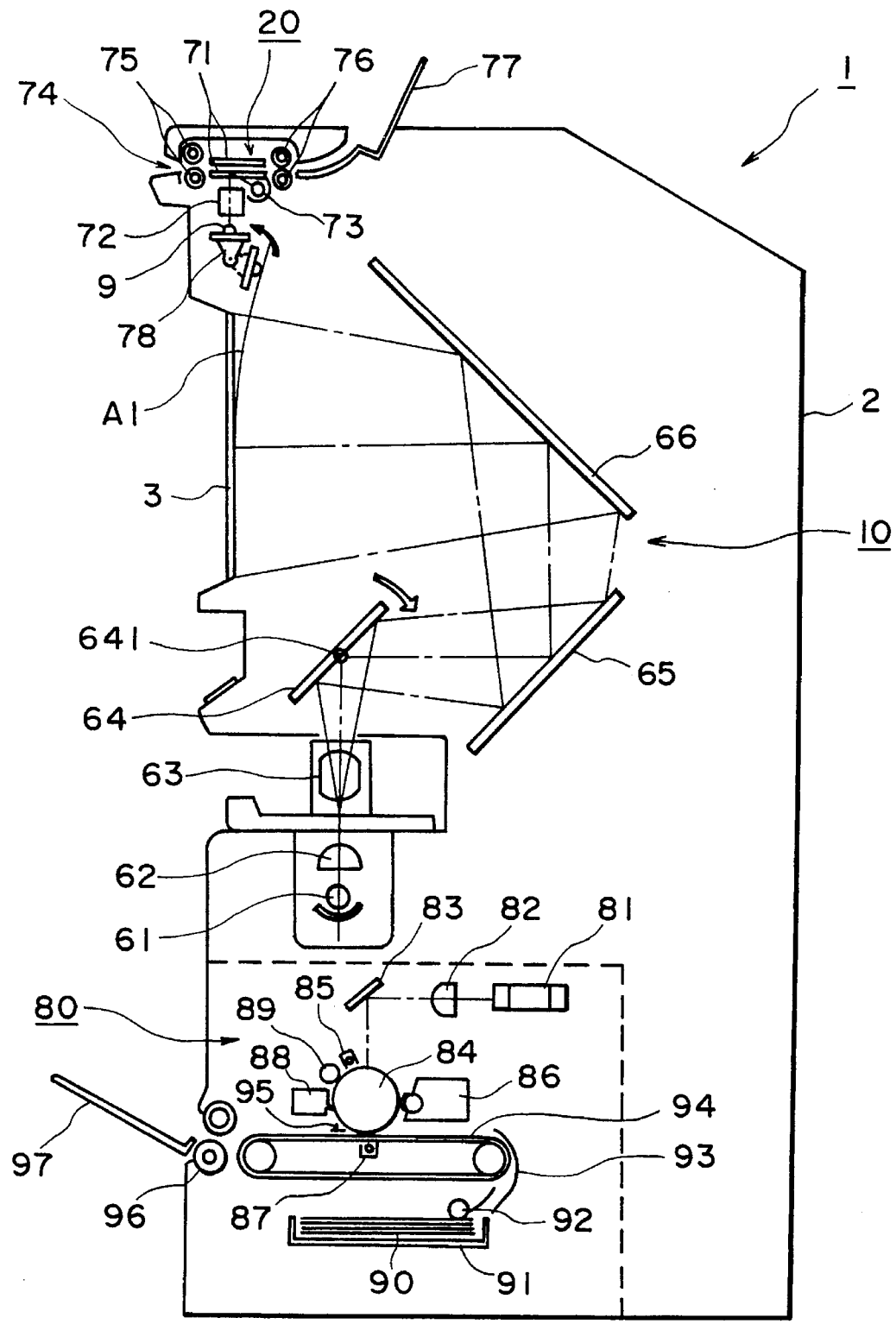
FIG. 16 is an elevational sectional view of an image treatment apparatus according to a fourth embodiment of the present invention.

FIG. 16 shows a fourth embodiment of the present invention. In this fourth embodiment, the second optical focusing system 20 for reading the original is arranged above the screen 3 disposed on the front surface of the body case 2, and a known print device 80 is incorporated into a lower portion of the body case 2, whereby all of the operations regarding the reader mode, the original reading mode, the film reading mode and the print mode can be performed at the front side of the body case 2.

Regarding this embodiment, in the reader mode, the first optical focusing system 10 focuses the image of the microfilm illuminated by the lamp 61 on the screen 3 through the condenser lens 62, the focusing lens 63, the scanning mirror 64, the second mirror 65 and the third mirror 66.

By rotating the scanning mirror 64 around a rotary shaft 641 at a predetermined speed, the image focusing plane A1 is shifted upwardly. The image on the moving plane A1 is sequentially read by the image sensor 9 arranged at the side of the second optical focusing system 20, thus performing the reading of the microfilm image.

Further, the second optical focusing system 20 focuses the image of the original being moved between a pair of flat glass plates 71 on the image sensor 9 through a short-focus lens array 72, thus reading the image. An illuminating lamp 73 for illuminating the original P is disposed near the short-focus lens array 72.

Further, one end of each of the flat glass plates 71 face an original insertion inlet 74 formed in the front surface of the body case 2, and a pair of feed rollers 75 are disposed between the original insertion inlet 74 and the flat glass plates 71. On the other hand, another pair of feed rollers 76 are disposed in the vicinity of trailing ends of the flat glass plates 71 so that the read original is discharged onto an ejector tray 77 arranged on the top of the body case 2.

The image sensor 9 is fixedly held by a rotary hinge 78 rotatably mounted on the body case 2. In the original reading mode, the image sensor 9 is oriented upwardly to face the above short-focus lens array 72; whereas, in the film reading mode, the image sensor 9 is rotated rearwardly by 90 degrees (phantom line position) to be positioned on the image focusing plane A1 for the microfilm.

The print device 80 serves to print the image on a recording sheet on the basis of the image information read by the image sensor 9 and preferably consists of a laser beam printer. The print device is of an electrostatic recording type wherein a laser beam emitted from a laser light source (not shown) in correspondence to each pixel of the image is deflected toward a main scanning direction by means of a polygonal mirror and the like and is directed onto a photosensitive drum 84 through a focusing lens 82 and a mirror 83 to expose the drum, thereby forming an electrostatic image on the photosensitive drum 84. The image formed on the drum is developed by a known electrostatic image forming process and is then transferred onto the recording sheet to obtain the print image.

Around the photosensitive drum 84, there are disposed, in order, a primary charger 85, a developing device 86, a transfer charger 87, a cleaner 88 and a discharger 89, which elements serve to perform the electrostatic image forming process. The recording sheets 90 are stacked in a cassette 91 and are sent to a conveying belt 94, one by one, by means of a supply roller 92 through a guide 93. The sheet is then fed, by the conveying belt 94, to a transferring portion 95 where the image is transferred from the photosensitive drum to the recording sheet. Thereafter, the recording sheet is fed to the fixing portion 96 where the image is permanently fixed to the sheet, and then the sheet is ejected onto an ejector tray 97 disposed on the front surface of the body case 2.

Figure 17:
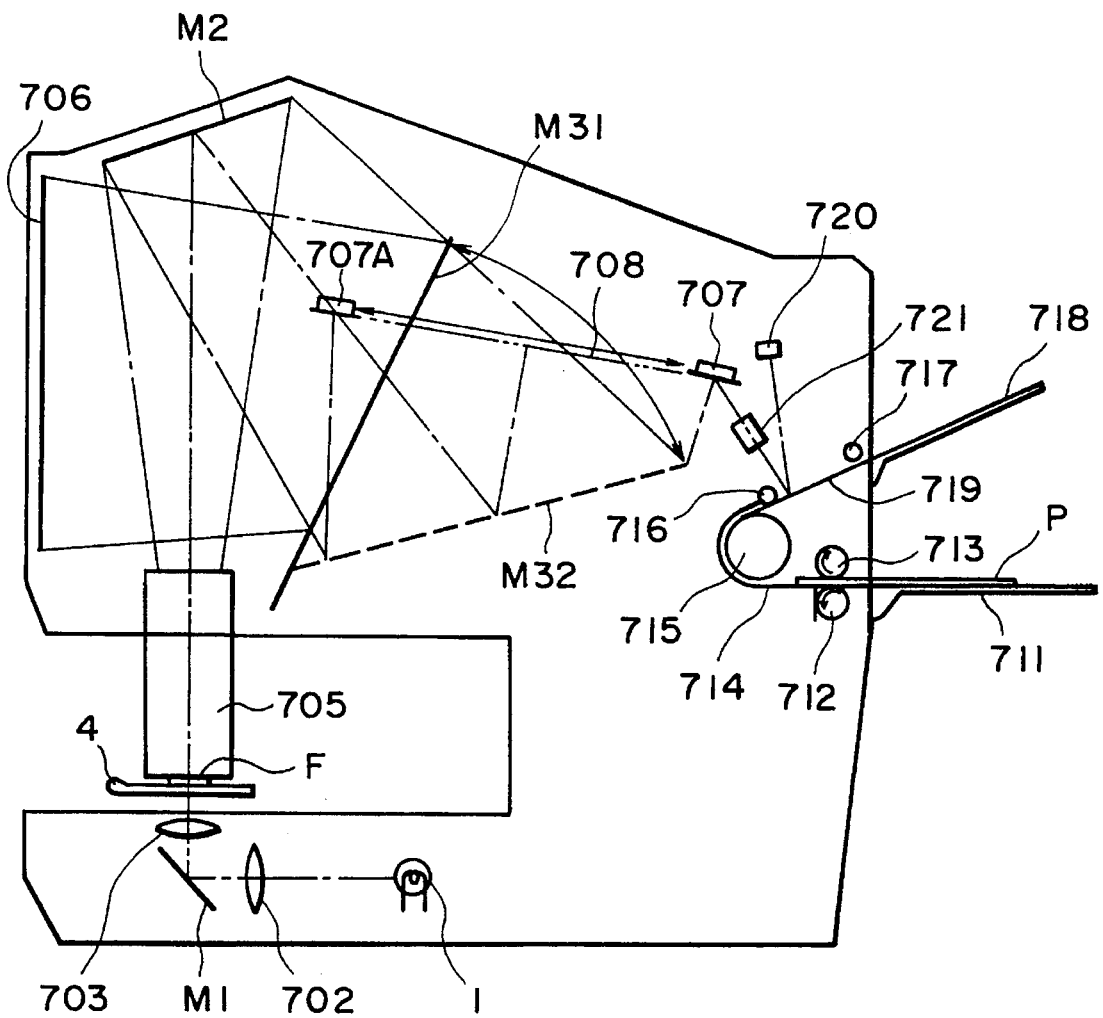
FIG. 17 is an elevational sectional view of an image treatment apparatus according to a fifth embodiment of the present invention.

FIG. 17 shows a fifth embodiment of the present invention. In FIG. 17, light from a lamp (light source) 701 is gathered by a condenser lens 702 and is deflected upwardly by a mirror M1, and then is gathered by a condenser lens 703. The microfilm F held by a film carrier 704 is illuminated by the light passed through the condenser lens 703 from the underside. The image of the microfilm F is enlarged by a projecting lens 705, and then is deflected by a fixed mirror M2 and movable mirror M31 and is projected on a screen 706 (a light path from the lamp to the screen is referred as "projection light path" hereinafter).

Next, a reading light path will be explained. Now, a line sensor of contact type such as a CCD (charge coupled device) is used as the image sensor 9. When the reading of the image is commanded from, for example, the operation portion (not shown), the movable mirror M31 is shifted up to a position M32 shown by a broken line and is stopped there. Then, the image of the microfilm F can be read by scanning a focusing plane 708 by means of a light receiving element 707. Other than this image reading operation, the light receiving element 707 is stopped at a position (initial position) shown by the solid line in FIG. 17.

Next, the reading of the image of a sheet-like original will be explained. The original P rested on an original tray 711 is fed out from the original tray by means of supply rollers 712, 713 and is deflected by guides 714, 715 and then is fed by a conveying roller 716. Light from a light source 720 such as a fluorescent lamp or LED (light emitting diode) illuminates the original P being fed, and the reflected light passes through a rod lens array 721 and is focused on the light receiving element 707. The original P being fed at a constant speed is conveyed onto an ejector tray 718 by means of an ejector roller 717.

Figure 18:
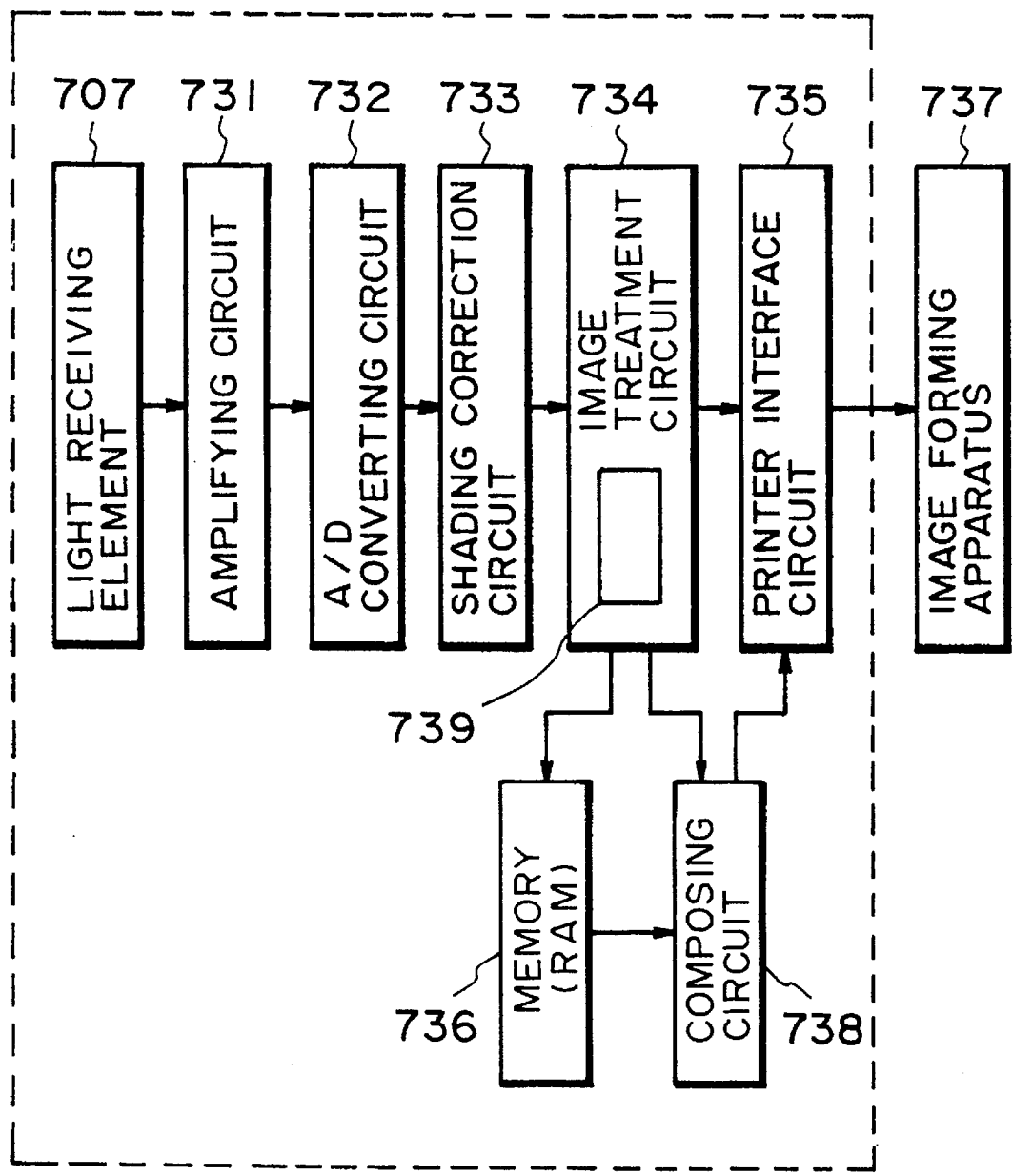
FIG. 18 is a control block diagram of the image treatment system.

FIG. 18 shows a circuitry of the image treatment apparatus according to the fifth embodiment, and arrows shown therein indicate a flow of an image signal. As shown in FIG. 18, the image of the microfilm or the image of the sheet original is converted into the electrical signal by means of the light receiving element 707 and is inputted to an amplifying circuit 731 where the signal is amplified. The amplified signal is inputted to an image treatment circuit 734 through an A/D (analogue-to-digital) converting circuit 732 and a shading correction circuit 733. After treated in the image treatment circuit 734, the signal is outputted to an image forming apparatus (print device) 737 such as an LBP through a printer interface circuit 735. Incidentally, in FIG. 18, a CPU (central processing unit), an operation portion, or the like are omitted.

Accordingly, in response to the copy demand from the operation portion (not shown), other than the microfilm image reading operation, by outputting the image information read from the original P to the image forming apparatus 737, it is possible to provide an microfilm image treatment apparatus also having an original image copying function.

Further, in the illustrated embodiment, on the basis of an image composing signal from the operation portion (not shown), it is possible to compose the image of the microfilm and the image of the original. That is to say, as mentioned above, the image information of the sheet original can be obtained by the light receiving element 707, and, as shown in FIG. 18, the image information treated by the image treatment circuit 734 is temporarily stored in a memory 736 such as a RAM (random access memory). Then, after the image information inputted to the light receiving element 707 is sent to the image treatment circuit 734, the image information now treated and the image information stored in the memory 736 are composed in a composing circuit 738, and a signal representative of the composed image information is sent to the printer interface circuit 735.

Figure 19:
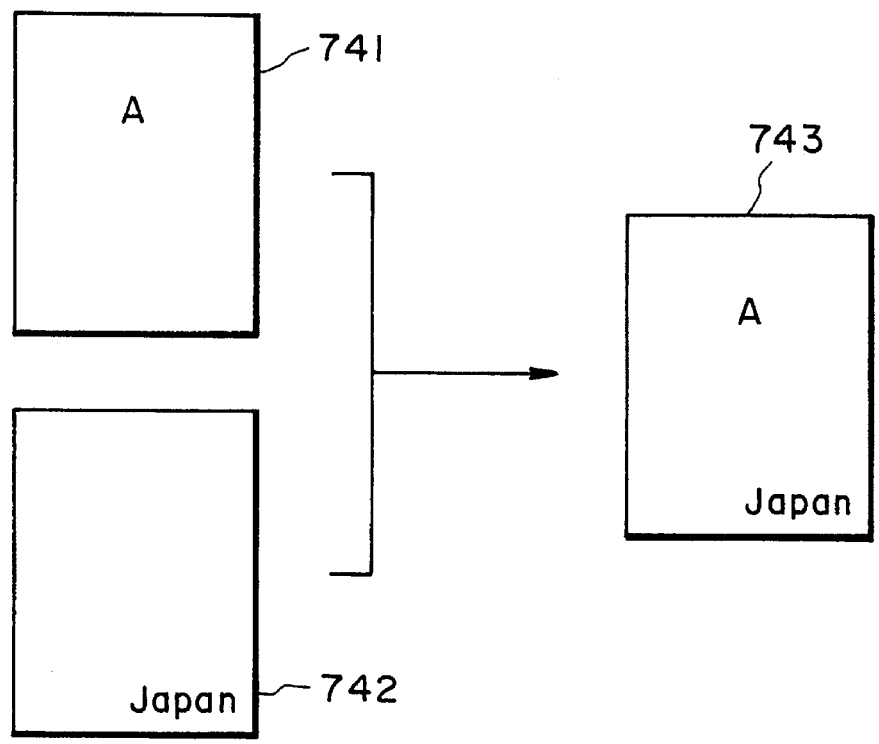
FIGS. 19 to 22 are explanatory views showing examples of images composed to obtain a desired output result.

As shown in FIG. 19, when the image information 741 of the microfilm and the image information 742 of the sheet original are composed in the composing circuit 738, a composed image 743 is obtained, and such composed image 743 is outputted from the image forming apparatus 737.

Figure 20:
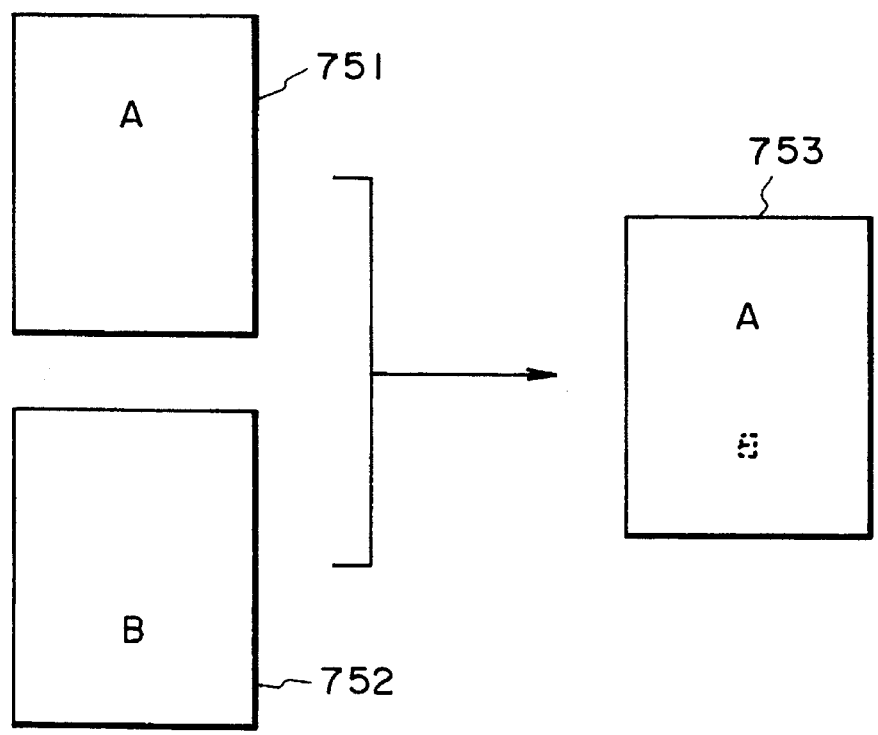

Further, in this case, if the image forming apparatus 737 is capable of performing a two-surface recording operation, as shown in FIG. 20, when the image information 751 of the microfilm and the image information 752 of the sheet original are composed, a composed image 753 is obtained. In this case, the fact that the character B is recorded on the back surface of the recording sheet is shown by a broken line character B.

Further, by adding an editing function to the image treatments circuit 734, various editing treatment can be effected. To this end, an image editing circuit 739 is incorporated into the image treatment circuit 734. On the basis of the command from the operation portion (not shown), the image information from the sheet original is treated in the image editing circuit 739 before it is stored in the memory 736. On the other hand, the image information of the microfilm is treated in the image editing circuit 739 after being treated and before it is composed in the composing circuit 738. Now, the editing function includes a masking trimming after area designation, enlargement and contraction in longitudinal and transverse directions, partial shift of image and the like. Next, concrete examples will be described.

Figure 21:
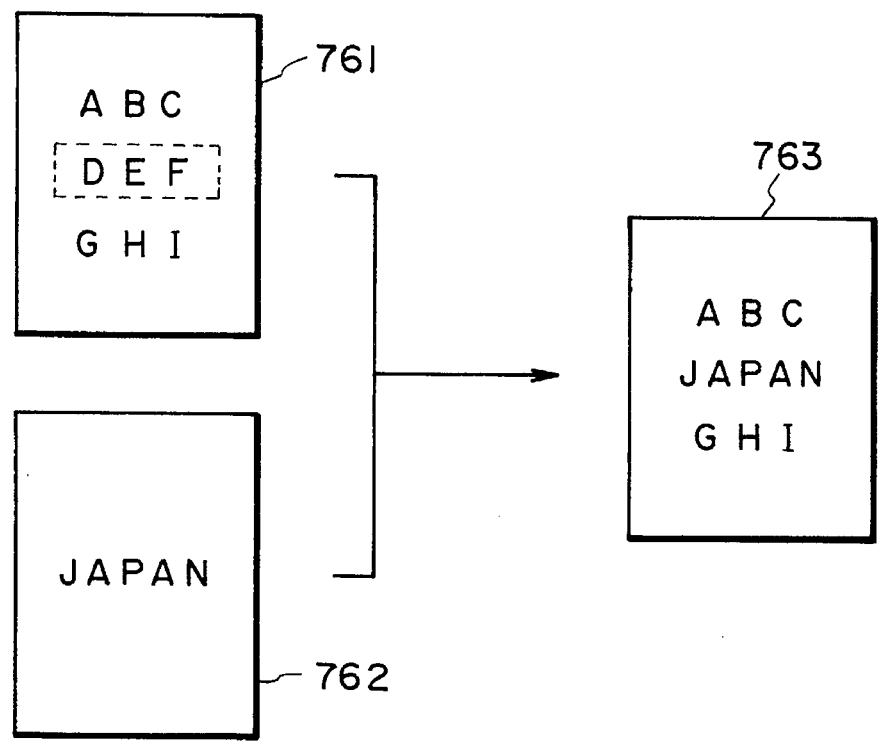

As shown in FIG. 21, when an area 764 encircled by a broken line on the image information 761 of the microfilm is masked in response to the positional data command from the operation portion (not shown) and such image information 761 is composed with the image information 762 of the original, a composed image 763 is obtained. That is to say, the image portion in the masked area 764 of the image information of the microfilm is replaced by the image information 762 of the original.

Figure 22:
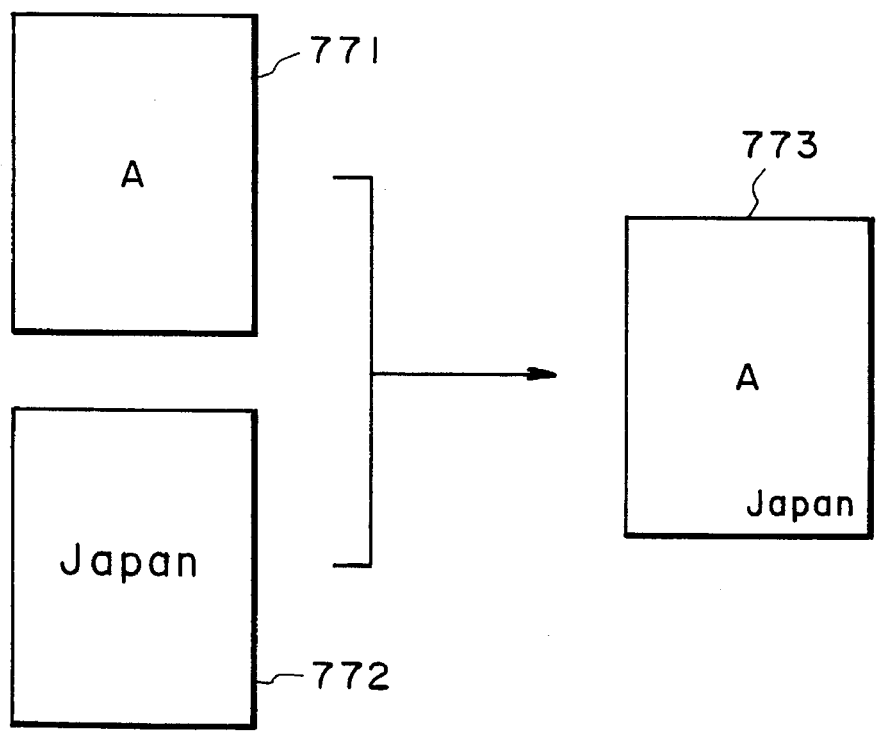

Next, as shown in FIG. 22, when the image information 772 of the original is contracted and shifted rightwardly and downwardly in response to the command from the operation portion (not shown) and such image information is composed with the image information 771 of the microfilm, a composed image 773 is obtained.

Incidentally, if an image transmission function is added to the printer interface circuit 735, it is possible to transmit the image information after composition.

Figure 23:
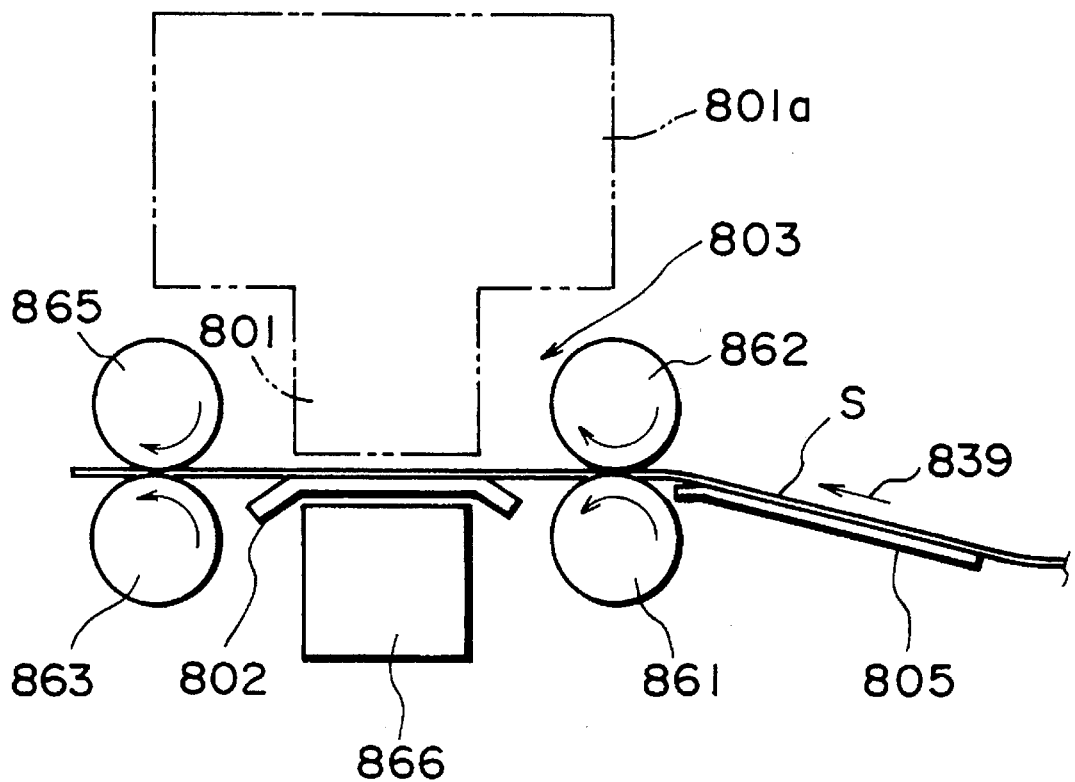
FIG. 23 is an explanatory view showing another embodiment of an image forming apparatus.

FIG. 23 shows another embodiment of an image forming apparatus. In this embodiment, the image forming apparatus is embodied as an ink jet recording apparatus wherein an image is recorded on a recording sheet by discharging ink from a recording head.

In FIG. 23, a printing portion 803 is constituted by an ink jet head 801 and a platen 802 disposed near and below the ink jet head. At an upstream side of the printing portion 803, there are arranged a pair of auxiliary scanning rollers 861, 862 rotated in directions shown by arrows, which rollers serve to direct a recording medium S being fed along a guide 805 to the printing portion 803. The recording medium S ejected from the printing portion 803 is conveyed by a pair of ejector rollers 863, 865 disposed at a downstream side of the printing portion 803 and rotated in directions shown by the arrows. In order to handle a recording medium S having a slow fixing speed, an ink fixing heater 866 is disposed at a downstream side of the platen 802.

The recording medium S is sent to the printing portion 803 and the ejector rollers 863, 865 by means of the auxiliary scanning rollers 861, 862, and in the printing portion the image is recorded on the recording medium by means of the ink jet head 801. Further, a carriage 801a scans or shifts in a direction perpendicular to a feeding direction of the recording medium.

The ink jet head 801 has an injection element for injecting liquid (ink) droplet by the use of thermal energy. During the scanning operation of the ink jet head 801, one-line recording is effected by injecting the liquid droplets from the injection element. After the one-line recording has been finished, the recording medium S is shifted by a predetermined amount in a direction shown by the arrow 839 by the predetermined amount of rotation of the ejector rollers 863, 865, thus permitting the next one-line recording. In this way, one-line recordings are repeated. When the entire recording operation of the recording medium S has been finished, the recording medium S is ejected out of the apparatus by the ejector rollers 863, 865.

As mentioned above, according to the present invention, since the first optical focusing system for focusing the image of the microfilm on the light receiving element and the second optical focusing system for focusing the image of the original are provided, and the image of the microfilm or the image of the original is selectively projected on the light receiving element by the switching means, it is possible to read both the image of the microfilm and the image of the original by a single apparatus without providing an additional apparatus such as an image scanner.

What is claimed is:

1. An image treatment apparatus, comprising:

a screen;

reading means for reading an image and converting it to an electrical signal;

first optical means for projecting an image of a film disposed at a first illuminating position, said first optical means including a mirror shiftable between a first position to project the image of the film at the first illuminating position onto said screen and a second position to project the image of the film onto said reading means;

second optical means for projecting an image of an original disposed at a second illuminating position different from the first illuminating position; and shift means for shifting said reading means between a relection light path of said mirror, when said mirror is disposed at the second position, and an optical path formed by said second optical means, to thereby selectively read one of the image of the film disposed at the first illuminating position and the image of the original at the second illuminating position using said reading means.

2. An image treatment apparatus according to claim 1, further comprising mode selecting means for switchably selecting a first mode for reading an image beam of the film which follows the reflection light path of said mirror or a second mode for reading an image beam of the original which follows the optical path formed by said second optical means.

3. An image treatment apparatus according to claim 2, wherein said mode selecting means has a mirror rockable between a first position to lead a beam which follows the reflection light path to said reading means, and a second position to lead a beam which follows the optical path of said second optical means to said reading means.

4. An image treatment apparatus according to claim 2, wherein said shift means is controlled so that when the first mode is selected said reading means is disposed in the reflection light path, and when the second mode is selected said reading means is disposed in the optical path of said second optical means.

5. An image treatment apparatus according to claim 1, wherein said shift means shifts in a constant speed in a direction transversing the reflection light path and the optical path of said second optical means.

6. An image treatment apparatus according to claim 1, further comprising a carrier for supporting said reading means and said second optical means, said carrier being shifted by said shift means.

7. An image treatment apparatus according to claim 6, wherein said shift means shifts said carrier at a constant speed in a direction transversing the reflection light path and the optical path of said second optical means.

8. An image treatment apparatus according to claim 6, wherein said carrier holds illumination means for illuminating the original, and shifts together with said illumination means.

9. An image treatment apparatus according to claim 1, further comprising change means for changing orientation of a light receiving surface of said reading means.

10. An image treatment apparatus according to claim 1, further including a first support member movable in a predetermined direction, a second support member removably mounted on said first support member and adapted to support said first optical means, and an original support member adapted to movably support said second support member and having an original resting surface, and wherein said second support member cooperates with said first support member to shift in said predetermined direction when said second support member is mounted on said first support member.

11. An image treatment apparatus according to claim 10, wherein said first support member is disposed within said image treatment apparatus, and said original support member is removably mounted on said image treatment apparatus.

12. An image treatment apparatus according to claim 1, further comprising move means for moving the original, said move means being controlled so that when reading the original said reading means is fixed at a predetermined position and the original is moved by said move means to scan the image thereon, and when reading the film the film is fixed and said reading means is shifted to scan the image on the film.

13. An image treatment apparatus according to claim 1, wherein the image on original is scanned by shifting said reading means.

14. An image reading apparatus, comprising:

a screen for observing an image;

an image sensor for reading the image and generating an electrical image signal;

first optical means for projecting the image of a film disposed at a first illuminating position, said first optical means including a mirror shiftable between a first position to project the image of the film at the first illuminating position onto said screen, and a second position to project the image of the film onto said image sensor;

second optical means for projecting an image of an original disposed at a second illuminating position different from the first illuminating position;

first shift means for shifting said image sensor between a reflection light path of said mirror, when said mirror is disposed at the second position, and an optical path formed by said second optical means, to thereby selectively read one of the image of the film disposed at the first illuminating position and the image of the original at the second illuminating position by using said image sensor; and second shift means for shifting said mirror between the first position and the second position.

15. An image reading apparatus, comprising:

first optical means for forming a first optical path projecting an image of a first original set at a first illuminating position on a first projecting position;

second optical means for forming a second optical path projecting an image of a second original set at a second illuminating position different from the first illuminating position on a second projecting position;

an image sensor for reading an image and converting the image to an electrical signal;

shift means for changing a posture of said image sensor so that a light receiving surface of said image sensor is selectively located at one of the first projecting position and the second projecting position;

first scan means for scanning the image of the first original when the light receiving surface of said image sensor is located on the first projecting position; and second scan means for scanning the image of the second original when the light receiving surface of said image sensor is located at the second projecting position.

16. An image reading apparatus according to claim 15, wherein said first optical means has a shiftable mirror, and said first scan means scans the image of the first original by rocking said mirror.

17. An image forming apparatus according to claim 15, wherein said second scan means scans the image of the second original by shifting the second original.

18. An image forming apparatus according to claim 15, wherein said shift means a change in posture of said image sensor by rotating said image sensor.

* * * * *

UNITED STATES PATENT AND TRADEMARK OFFICE
CERTIFICATE OF CORRECTION

PATENT NO. : 5,608,537
DATED : March 4, 1997
INVENTOR(S) : Manabe et al.

It is certified that error appears in the above-indentified patent and that said Letters Patent is hereby corrected as shown below:

COLUMN 9

Line 5, "face" should read --faces--.

COLUMN 10

Line 20, "analogue-to-digital" should read --analog-to-digital--.

COLUMN 12

Line 24, "relection" should read --reflection--.

Signed and Sealed this

Second Day of December, 1997

Attest:

BRUCE LEHMAN

Attesting Officer

Commissioner of Patents and Trademarks